Jan. 18, 1955 W. A. GEYGER 2,700,130

SELF-BALANCING MAGNETIC AMPLIFIER

Filed July 2, 1952 4 Sheets-Sheet 1

INVENTOR.

W. A. Geyger

BY

ATTORNEYS

Jan. 18, 1955 W. A. GEYGER 2,700,130

SELF-BALANCING MAGNETIC AMPLIFIER

Filed July 2, 1952 4 Sheets-Sheet 2

INVENTOR.
W. A. Geyger

BY
[signature]
[signature]
ATTORNEYS

INVENTOR.
W. A. Geyger
BY G. D. O'Brien
R. M. Hicks
ATTORNEYS

INVENTOR.
W. A. Geyger
BY
A. D. O'Brien
R. M. Hicks
ATTORNEYS

United States Patent Office 2,700,130

Patented Jan. 18, 1955

2,700,130

SELF-BALANCING MAGNETIC AMPLIFIER

Wilhelm A. Geyger, Washington, D. C.

Application July 2, 1952, Serial No. 296,975

8 Claims. (Cl. 323—89)

(Granted under Title 35, U. S. Code (1952), sec. 266)

The invention described herein may be manufactured and used by or for the Government of the United States of America for governmental purposes without the payment of any royalties thereon or therefor.

This invention comprises novel and useful improvements in magnetic amplifiers and more particularly pertains to a self-balancing magnetic amplifier for current measurements.

Since a magnetic amplifier is a low input impedance current operated device, the introduction of the control windings of a magnetic amplifier in a circuit to be tested will cause considerable disturbance of the electrical characteristics of the circuit. The instant invention relates to a magnetic amplifier in which the current from the circuit to be tested which flows through the control windings is automatically compensated by an opposite current of substantially equal magnitude so that the voltage drop across the magnetic amplifier is theoretically zero and practically about 100 to 1000 times smaller than the voltage drop across the control windings when no compensating current is applied. Fulfillment of balance conditions in the control circuit is achieved by special compound feedback circuitry. Positive external or self-feedback is adjusted so as to produce an effectively infinite gain that is highly degenerated by negative feedback through the galvanically coupled control circuit loop operating under current-balance conditions. Such an amplifier has a large overall gain, etxreme stability, linear output-input characteristics, a high speed of response and affords effectively zero impedance to the circuit to be tested when utilized as a current measuring device.

An important object of this invention is to provide a magnetic amplifier for use in the measurement of current, which amplifier has substantially zero effective input impedance and requires only extremely small power from the input source.

Another object of this invention is to provide a magnetic amplifier which has linear output-input characteristics.

A further object of this invention is to provide a magnetic amplifier having an effective input impedance which is substantially zero, and which circuit will produce an output signal correlative in amplitude and polarity with the magnitude and sign of the input signal.

Yet another object of this invention is to provide a magnetic amplifier having an effective input impedance which is substantially zero, which amplifier produces an A. C. output having amplitude and phase correlative with the magnitude and sign of the input signal.

Other objects and many of the attendant advantages of this invention will be readily appreciated as the same becomes better understood by reference to the following detailed description when considered in connection with the accompanying drawings wherein.

Figure 1:
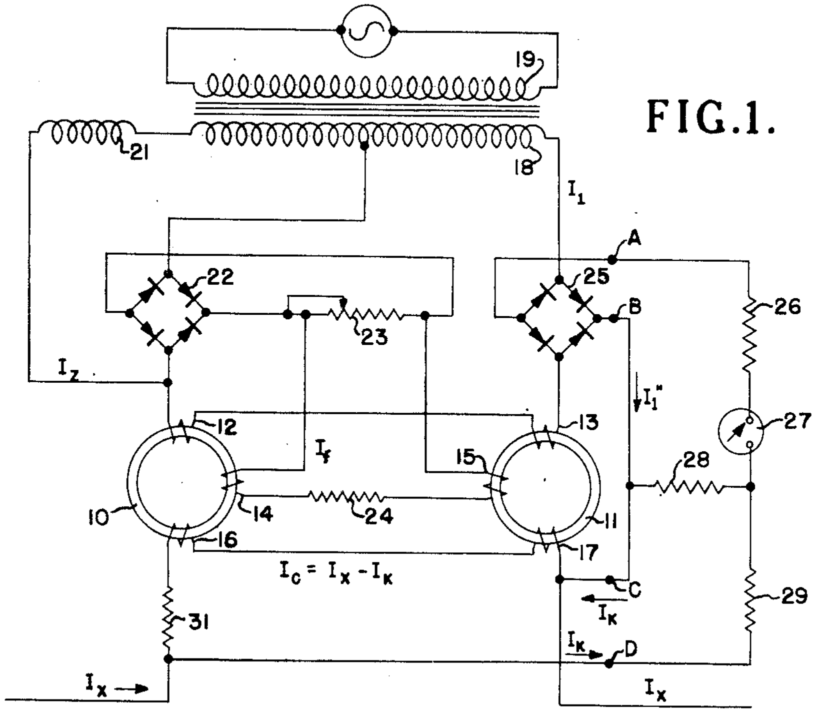
Fig. 1 is a schematic diagram of an external-feedback type magnetic amplifier employing degenerative feedback.

Fig. 1 illustrates the basic circuit of a self-balancing magnetic amplifier for current measurements. The pair of reactor elements 10 and 11 have series aiding-connected A. C. load windings 12 and 13, series opposing connected feedback windings 14 and 15, and series opposing connected control windings 16 and 17 so that the voltages induced in each of the twin windings 14, 15 and 16, 17 by the fundamental and odd harmonics of the supply voltage $E_s$ are opposed and cancel each other. The load windings 12 and 13 are energized from the supply source $E_s$ through one-half 18 of the center-tapped secondary winding of supply transformer 19. A balancing current $I_z$ exercising a bias effect is produced by the center-tapped transformer 19 and series impedance 21. The bias current $I_z$ produces an additional D. C. magnetization in the cores 10 and 11 which is opposing to the D. C. magnetization produced by the feedback windings 14 and 15 and independent of the control current $I_c$ flowing through the control winding 16.

Regenerative feedback current $I_f$ is provided by the full-wave bridge type rectifiers 22 and regenerative control shunting resistor 23, which latter resistor is in shunt with the regenerative feedback circuit including feedback windings 14, 15, the resistance of which feedback windings is diagrammatically indicated as a lumped resistance 24. The regenerative feedback control resistor 23 is adjusted, for reasons to be hereinafter set forth, so that the average value of the regenerative feedback ampere turns equals the average value of the load ampere turns, which condition is known in the art and hereinafter referred to as "compensated feedback."

In the embodiment illustrated in Fig. 1, the full-wave rectified current $I_1''$ from bridge rectifier 25, which represents the average value over one-half cycle of the alternating current $I_1$ flowing through the load windings 12 and 13, is applied to the load circuit connected to terminals A, B. The load circuit includes load resistor 26, ammeter 27 and degenerative control resistor 28. The potential across resistor 28 is applied through resistor 29 across terminals C, D of the control circuit whereby a degenerative feedback current $I_k$ is caused to flow through the control windings 16, 17 and through the resistance in the control circuit diagrammatically indicated as lumped resistance 31, which degenerative feedback current opposes the current $I_x$ to be measured. The resultant control current $I_c$ is thus equal to the difference between the current $I_x$ to be measured and the degenerative feedback current $I_k$. When $I_x$ is zero, a very small "negtive" control current will flow through the control windings 16 and 17, which negative current is given by the following expression:

[1]
$$I_c = -I_k = \frac{I_1 R_{28}}{R_{28}+R_{29}}$$

where $I_1$ is the load current, and $R_{28}$ and $R_{29}$ are respectively the values of resistance 28 and 29 in the degenerative feed circuit.

It is to be noted that the current balance arrangement illustrated in Fig. 1 does not require an external conduction path through the circuit under test because the above mentioned negative control current $I_c = -I_k$ producing the necessary degenerative feedback can flow freely through the negative feedback circuit loop resistors 28 and 29.

The reactor elements 10 and 11 are preferably nickel-iron-alloy cores having inherent current transformer characteristics. Thus, the total ampere-turns of the load windings 12, 13 are equal to the total ampere-turns of the control windings 16, 17 and feedback windings 14, 15, respectively:

[2]
$$I_1N_1 = I_cN_c + I_fN_f = I_x - \left(\frac{I_1R_{28}}{R_{28}+R_{29}}\right)N_c + I_1N_f \cdot \frac{R_{23}}{R_{23}+R_{24}}$$

where $N_1$, $N_c$ and $N_f$ are respectively the number of turns in the load windings, control windings and feedback windings on each reactor element, and $R_{23}$ and $R_{24}$ are the resistance values of resistors 23 and 24 respectively. When a current $I_x$ is applied to the control circuit, the load current $I_1$ increases. Since the average value of $I_1$ equals the average value of $I_1'$ and $I_1''$, neglecting rectifier imperfections, a compensating current $$I_k = I_1.R_{28}/[R_{28}+R_{29}]$$

flows through the degeneration network exercising a controlling effect on $I_1$. In practice, however, departure of the feedback rectifier from the ideal characteristic causes a certain reduction in the current ratio $I'_1/I_1$ so that the actual feedback ampere turns $I_fN_f$ are also reduced. By proper adjustment of the shunting resistor 23 it is possible to compensate this effect of feedback-rectifier imperfection.

Referring to Equation 2 the relationship between $I_x$ and $I_1$ is given by the equation:

$$[3] \qquad \frac{I_x}{I_1} = \frac{R_{28}}{R_{28}+R_{29}} + \frac{N_1 - N_f \cdot R_{23}/[R_{23}+R_{24}]}{N_c}$$

Thus by adjusting the regeneration to obtain "critical" regeneration [compensated feedback] with $$N_f.R_{23}/[R_{23}+R_{24}] = N_1:$$

$$[4] \qquad \frac{I_1}{I_x} = \frac{R_{28}+R_{29}}{R_{28}}$$

where $$\frac{R_{28}+R_{29}}{R_{28}}$$

represents the "current ratio" of the circuit.

Referring to Equation 4 it is apparent that with "critical" regeneration [when load ampere turns are exactly compensated by the regenerative feedback ampere turns] the compensating current $I_k = I_1.R_{28}/[R_{28}+R_{29}]$ will be equal to the current $I_x$ to be measured and control current $I_c = I_x - I_k$ will be zero. The control windings $N_c$ exert only a transient type of control on the two reactor elements, while the regenerative external feedback windings $N_f$ and the A. C. load windings $N_1$ supply the power for establishing the output current $I_1$. If the control current $I_c$ is observed by means of a micro-ammeter while an input current $I_x$ is applied, no change is noticeable. Therefore, this current-balance condition of zero control current may be used as the criteria in practice for adjustment of the regeneration control resistor 23. If 23 is adjusted above or below the point of critical regeneration while the control circuit is subjected to variations in input current $I_x$, a control current $I_c$ will flow in a direction dependent on the direction of actual misadjustment.

For practical applications of a magnetic amplifier, as illustrated in Fig. 1, the feature of zero control current for the entire working range of output current $I_1$ effects a materially more linear relationship between the currents $I_x$ and $I_1$ as represented by Equation 4. The self-balanced control circuit demands no energy from the circuit under test carrying the direct current $I_x$ because, even with optimal input circuit matching conditions, the effective input voltage $[I_x - I_k]R_{31}$ [where $R_{31}$ is the resistance value of resistor 31] is theoretically zero and is practically much smaller than $I_xR_{31}$. This fact is particularly important where a very small input circuit resistance of the magnetic amplifier is of paramount importance. Further, over certain ranges, large variations in magnitude and frequency of the supply voltage $E_s$, and changes in the load resistance 26 have comparatively small effect on the ratio $I_x/I_1$.

Variations in the degeneration network illustrated in Fig. 1 are possible. One such variation illustrated in Fig. 2 includes a load resistor 31 adapted for connection across terminals A, B to the output of the full-wave rectifier 25. The voltage $E_1$ across the load resistor, measured by a voltemeter 32, is applied through resistor 33 to the terminals C, D of the control windings 16 and 17 to thereby cause a negative feedback current $I_k$ to flow therethrough. The expression $$\frac{E_1}{I_x} = R_{33}$$

represents the actual "transresistance" of this magnetic amplifier, where $R_{33}$ is the resistance value of resistor 33.

Figure 2:
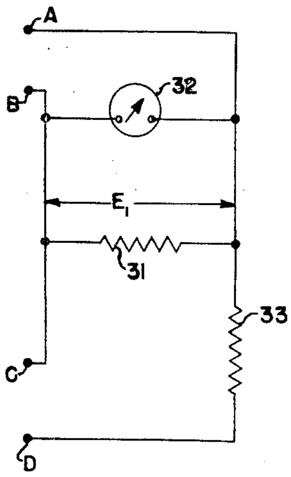
Fig. 2 is a schematic diagram of an external feedback type magnetic amplifier employing a modified form of degenerative feedback network.

It is also possible to utilize self-feedback circuitry instead of the external feedback circuit illustrated in Figs. 1 and 2. As is well known in the art, self-saturating circuits, in effect, function like a highly regenerative external feedback magnetic amplifier, the regenerative feedback effect differing from compensated feedback, as hereinbefore defined, only because of rectifier imperfections. However, compensated feedback may be achieved by the provision of an additional regenerative feedback circuit which compensates for dry-disk rectifier imperfections.

Figure 3:
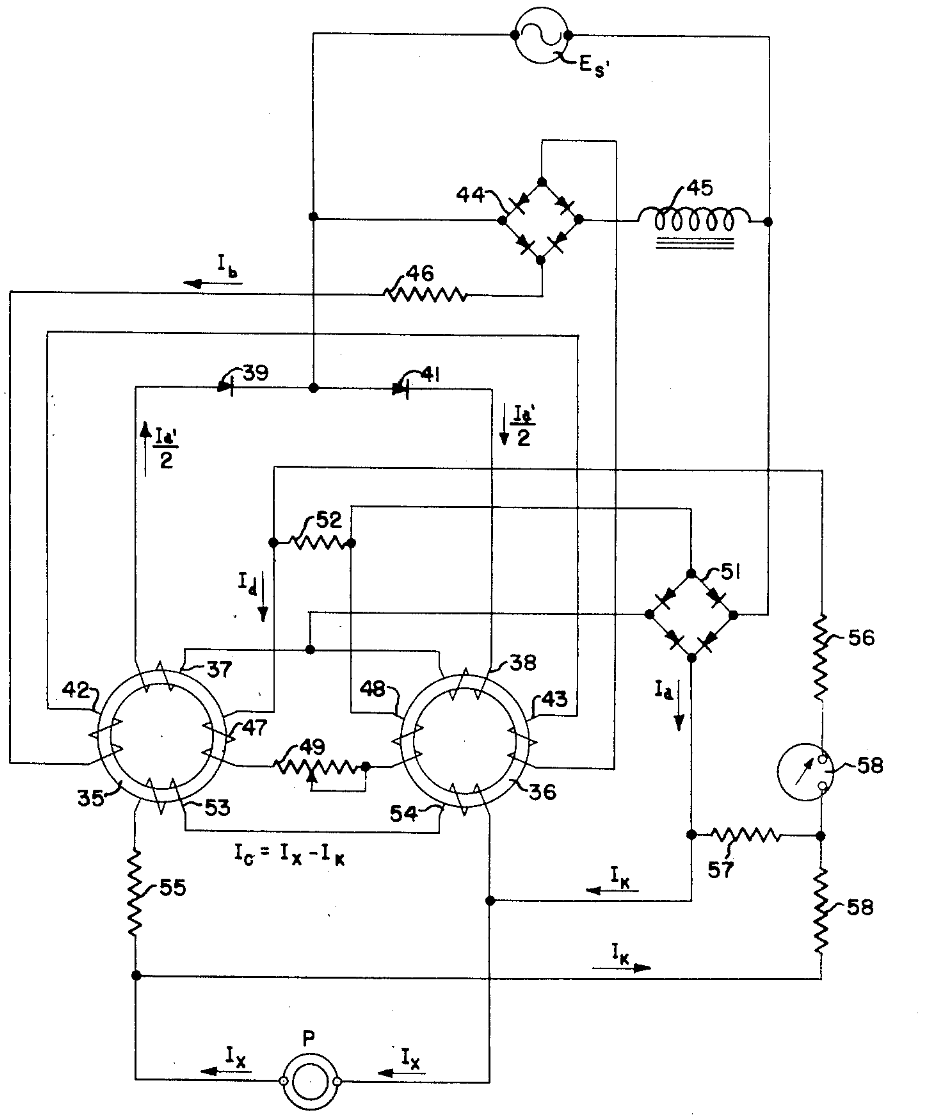
Fig. 3 is a schematic diagram of a self-saturating type magnetic amplifier employing compound feedback.

Fig. 3 illustrates the basic circuit of a self-balancing magnetic amplifier for current measurements utilizing self-feedback circuitry. A pair of cores 35 and 36 preferably having rectangular hysteresis-loop core material have load windings 37 and 38 thereon. The load windings 37 and 38 are energized from a suply source $E_s'$ through half-wave rectifier elements 39 and 41 respectively so that current pulses $I_a'/2$ flow through load windings 38 and 39 during alternate half-cycles of the supply voltage $E_s'$. Bias current $I_b$ is supplied to bias windings 42 and 43 by the full-wave rectifier 44 which is connected in series with an impedance 45 across the supply source $E_s'$. The full-wave bias current is applied through series resistor 46 which is adjusted so that the bias current reduces the "quiescent current value" of the current $I_a'$. Boosting windings 47 and 48 in series with a regenerative control resistor 49 exercise an additional regenerative feedback effect and are supplied with feedback current $I_d$ from a full-wave rectifier 51.

A shunt resistor 52 is connected across the regenerative feedback windings and by proper adjustment of the regenerative control resistor 49, it is possible to compensate for the departure of the half-wave rectifier elements 39 and 41 from ideal characteristics and thereby to obtain critical regeneration or compensated feedback.

As in the preceding embodiments, control is provided from current source P, which produces the current $I_x$ to be measured, by control windings 53 and 54 which may be connected in series with a resistor 55 across the control source. In the embodiment illustrated in Fig. 3, however, the same full-wave rectifier 51 which supplies the regenerative feedback boosting current also supplies load current $I_a$ to the load 56 and degenerative feedback control resistor 57, which load current is measured by ammeter 58. The signal appearing across the degenerative control resistor is galvanically applied, through resistor 58 to the control circuit to thereby cause a compensating current $I_k$ to flow through the control windings in a direction opposite to the direction of flow of the current $I_x$ to be measured. Thus, the control circuit operates under current balance conditions in which the current to be measured exercises only a transient type of control, and the magnetic amplifier demands practically zero power from the current source P.

Figure 4:
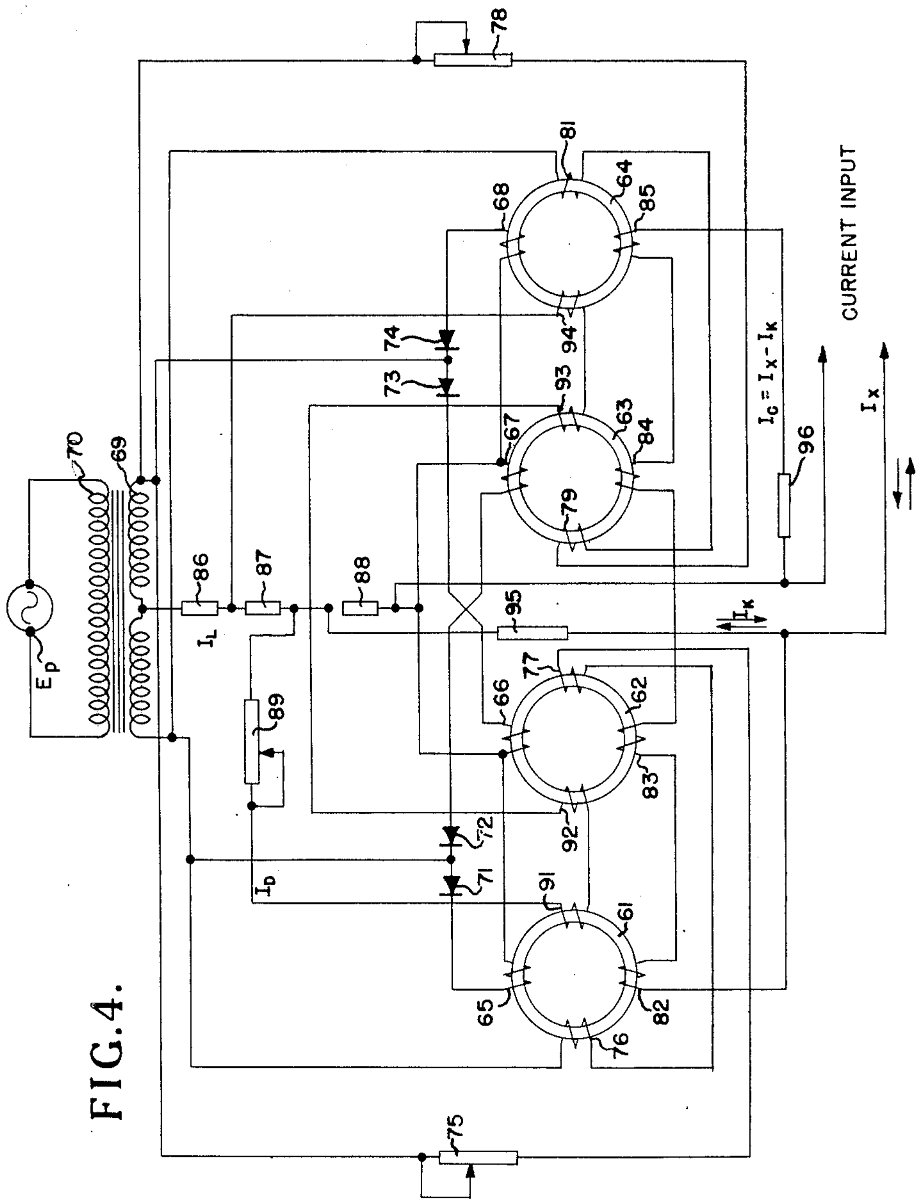
Fig. 4 is a schematic diagram of a push-pull type self-saturating magnetic amplifier.

Fig. 4 illustrates a push-pull type self-balancing magnetic amplifier. Reactor elements 61, 62, 63 and 64 respectively, have load windings 65, 66, 67 and 68 thereon, which load windings are energized from the center-tapped secondary winding 69 of transformer 70 through halfwave rectifiers 71, 72, 73 and 74. The rectifiers are arranged so that load windings 66 and 67 are energized during one half-cycle of the supply voltage $E_p$, and windings 65 and 68 are energized during the other half cycle of the supply voltage. Proper quiescent current values of the output currents of the balanced saturable reactor systems are established by the bias circuit including adjustable resistor 75 and bias windings 76 and 77 on reactors 61 and 62 and by the bias circuit including adjustable resistor 78 and bias windings 79 and 81 on reactors 63 and 64.

Control windings 82, 83, 84 and 85 on reactors 61—64 respectively are arranged so that for a given polarity of the current $I_x$ to be measured, the control ampere turns will differentially vary the impedances of reactors 62 and 63 during one-half cycle of the supply voltage $E_p$ and differentially vary the impedances of reactors 61 and 64 during the other half cycle of the supply voltage.

Load current $I_1$ flows through series connected load 86 and resistors 87 and 88. Critical regeneration can be obtained by proper adjustment of the regeneration control resistor 89 which is connected in series with positive-feedback windings 91, 92, 93 and 94 across resistor 87. With critical regenerative feedback obtained by proper adjustment of the differential positive feedback ampere-turns, as by adjustment of resistor 89, the polarity reversible current $I_x$ to be measured will be self-balanced by the variable polarity reversible compensating current $I_k$ which is produced by the voltage drop across resistor 88 and series resistor 95, which compensating current is galvanically applied to the control circuit including control windings 82—85 and series resistor 96. The resultant D. C. load current $I_l$ flowing through the D. C. load 86 is duo-directional and is zero for zero input current $I_x$. The control circuit operating under current balance conditions demands practically no energy from the circuit under test carrying the input current $I_x$, even when optimum impedance matching is used. Thus the circuit of Fig. 4 is adapted for operation on input signals of either polarity, and delivers a D. C. output signal correlative in phase and amplitude with the magnitude and sign of the input signal.

Figure 5:
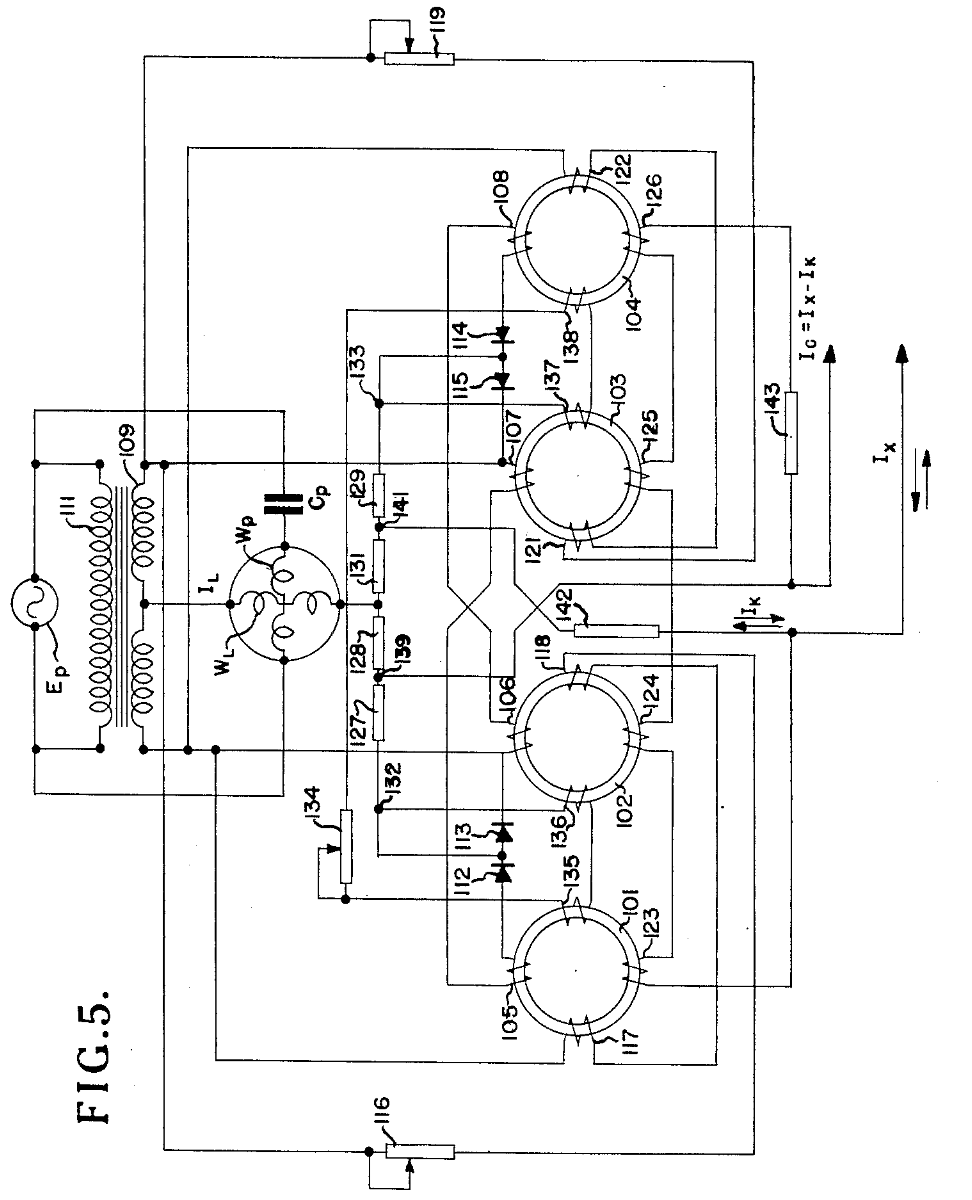
Fig. 5 is a schematic diagram of a ring modulator type self-saturating circuit with an A. C. load.

However, the push-pull circuit of Fig. 4 is not adapted for an A. C. load. Fig. 5 illustrates a ringmodulator type self-saturating push-pull circuit with an A. C. load which has been adapted, by the provision of compound feedback, for operation under current balance conditions in the control circuit.

Reactor elements 101, 102, 103 and 104 respectively have load windings 105, 106, 107 and 108 wound thereon. During one-half cycle of the supply voltage $E_p$, load windings 105 and 107 are energized from the center-tapped secondary 109 of transformer 111 through half-wave rectifiers 112 and 113, and during the other half-cycle of the supply voltage, load windings 106 and 108 are energized through half-wave rectifiers 114 and 115. Proper quiescent load current values are established by the A. C. bias circuit including adjustable resistor 116 and bias windings 117 and 118 on reactors 101 and 102, and by bias circuit including adjustable resistor 119 and bias windings 121 and 122 on reactors 103 and 104. Control windings 123, 124, 125 and 126 are respectively provided on reactors 101—104 and arranged so that the impedances of reactors 101 and 103 and the impedances of reactors 102 and 104 are differentially varied during the conducting half-cycles of the load windings on the respective reactors. In the absence of a control signal $I_c$, the reactor elements 101 and 103 fire at substantially the same time, and the net current flow through resistors 127 and 128 is zero during the half-cycle of the supply voltage $E_p$ during which rectifiers 112 and 113 are conducting. Similarly, during the other half-cycle of the supply voltage, reactors 102 and 104 fire at substantially the same time, if the control current $I_c$ is zero, and the net current flow through resistors 129 and 131 is also zero. When the control current $I_c$ is other than zero, load current will flow during one-half cycle of supply voltage $E_p$ in one direction, dependent on the sign of the control current, through resistors 127 and 128 and through the A. C. load such as the amplifier field winding $W_1$ of a two-phase induction motor and, during the other half-cycle of supply voltage $E_p$, current will flow through resistors 131 and 129 and through winding $W_1$ of the motor in a direction opposite the direction of current flow through the winding during the previous half-cycle. Thus, a D. C. voltage appears across terminals 132 and 133 of an amplitude and phase correlative with the magnitude and sign of the control signal $I_c$, which voltage is applied through regenerative control resistor 134 to regenerative feedback windings 135, 136, 137 and 138 on reactor elements 101—104 respectively. Similarly, a D. C. voltage appears across terminals 139 and 141 of a magnitude and polarity dependent on the amplitude and sign of the control signal $I_c$, which voltage is applied, through resistor 142 to the control circuit in such a manner as to cause a negative feedback current $I_k$ to flow through the control circuit, the resistance of which is diagrammatically indicated as the lumped resistance 143, in a direction opposite the direction of flow of the current $I_x$ to be measured.

As is conventional, the line field winding $W_p$ of the motor may be energized, through phasing condenser $C_p$ from the supply source $E_p$.

Thus, in each of the embodiments illustrated in Figs. 1–5, a magnetic amplifier for current measurements having effectively zero input impedance is achieved by providing regenerative feedback ampere turns equal to the load ampere turns and a degenerative feedback current which is resistance-coupled into the control circuit loop. It is to be noted that the effective input impedance of the magnetic amplifier would not be changed if the degenerative feedback were inductively applied, as through separate windings. However, by resistance-coupling the degenerative feedback current into the control circuit, the effective control current flowing through the control windings can be reduced to zero when "critical" positive feedback is used. In this manner, a magnetic amplifier having an effective zero input impedance and linear output-input characteristics is provided.

The embodiments illustrated in Figs. 1 and 2 provide external regenerative feedback while the embodiments illustrated in Figs. 3–5 provide self-feedback through rectifiers in series with the load windings. In the latter embodiments utilizing self-feedback, additional "boosting" feedback windings must be provided to compensate for rectifier imperfections.

Each of the embodiments illustrated in Figs. 1–3 provide a unidirectional output signal correlative in amplitude with the signal to be measured. The push-pull circuit of Fig. 4 provides a D. C. output correlative in amplitude and polarity with the magnitude and sign of the input signal, and the ringmodulator type circuit illustrated in Fig. 5 provides an A. C. output correlative in amplitude and phase of the input signal. As is apparent, the ringmodulator type circuit is particularly adapted for operation under current balance conditions where an A. C. output is desired since the circuit also provides a D. C. output across resistors 127, 128 and across resistors 129, 131 for supplying the needed regenerative boosting feedback and the degenerative feedback.

Obviously, derivative feedback may be utilized in the degeneration network to improve transient response characteristics, if so desired.

As utilized in the claims, the term compensated feedback is applicable to both external feedback and self-saturating circuitry. In external feedback circuitry, compensated feedback is provided by a separate regenerative feedback circuit adjusted so that the regenerative feedback M. M. F. equals the load M. M. F. Compensated feedback is effected in self-saturating circuitry by the self-regenerative effect of the half-wave rectifiers in series with the load windings which regeneration is aided by a separate positive feedback circuit which provides the necessary boosting ampere-turns to compensate for rectifier imperfections.

Obviously many modifications and variations are possible in the light of the above teachings. It is therefore to be understood that within the scope of the appended claims the invention may be practiced otherwise than as specifically described.

What is claimed and desired to be secured by Letters Patent of the United States is:

1. A magnetic amplifier comprising a pair of saturable reactor elements each having a load winding and a control winding thereon, means including a source of A. C. voltage for energizing the load windings, an input circuit including said control windings adapted to be connected to a current signal source, means for applying compensated feedback to said reactor elements, and means resistance-coupled to said input circuit and connected across the control windings for causing a degenerative feedback current substantially equal in magnitude with the current signal to flow through said control windings in a direction opposite the direction of flow of said current signal therethrough.

2. A magnetic amplifier comprising a pair of saturable reactor elements each having a load winding and a control winding thereon, means including a source of A. C. voltage for energizing the load windings, an input circuit including said control windings adapted to be connected to a current signal source, means for applying compensated feedback to said reactor elements, a load circuit connected to said load windings and including an impedance element, and circuit means connected to said input circuit in parallel with the control windings and responsive to the signal appearing across said impedance element for causing a D. C. current substantially equal to the current signal to flow through the control windings in a direction opposite the direction of flow of said current signal therethrough.

3. A magnetic amplifier comprising a pair of saturable reactor elements each having a load winding and a control winding thereon, means including a source of A. C. voltage for energizing the load windings, an input circuit including said control windings adapted to be connected to a current signal source, means for applying compensated feedback to said reactor elements, a load circuit connected to said load windings and including an impedance element, and circuit means connected across said control windings, said impedance element and a resistance element connected in series for causing a D. C. current to flow through the control windings in a direction opposite the direction of flow of said current signal therethrough.

4. A magnetic amplifier comprising a pair of saturable reactor elements each having a load winding, a positive feedback winding, and a control winding thereon, means including a source of A. C. voltage for energizing said load windings, an input circuit including said control windings adapted to be connected to a current signal source, circuit means for energizing said positive feedback windings with a current correlative with the load current flowing through said load windings and of an amplitude such that the positive feedback M. M. F. substantially equals the load winding M. M. F., and means for impressing a voltage across said control windings responsive to the flow of load current through said load windings for causing a D. C. current of a magnitude substantially equal to said current signal to flow through said control windings in a direction opposite the direction of flow of said current signal therethrough.

5. A magnetic amplifier comprising a pair of saturable reactor elements each having a load winding, a positive feedback winding, and a control winding thereon, means connecting said load windings across an alternating current source, first and second means for respectively deriving first and second D. C. voltages proportional to the current in said load windings, means responsive to said first D. C. voltage for applying regenerative feedback to said positive feedback windings of a magnitude such that the regenerative feedback M. M. F. substantially equals the load M. M. F., an input circuit including said control windings adapted to be connected to a current signal source, means connected in parallel with the control windings responsive to said second D. C. voltage for causing a D. C. current of a magnitude substantially equal to the current signal to flow through said control windings in a direction opposite the direction of flow of said current signal therethrough.

6. A magnetic amplifier comprising a pair of reactor elements each having a load winding thereon, circuit means including half-wave rectifiers in series with each load winding for connecting said load windings to a source of A. C. voltage whereby said load windings are energized during alternate half-cycles of the A. C. voltage, an input circuit including control windings on each reactor element for differentially varying the impedances of said reactor elements in response to a current signal, means including regenerative feedback windings on said reactors and responsive to the flow of current through said circuit means for producing a regenerative feedback which aids the regenerative feedback effect produced by said rectifiers in said circuit means to thereby provide compensated feedback, and means connected across the control windings responsive to the current in said circuit means for applying a D. C. current to said control windings of a magnitude equal to the current signal applied to the input circuit and in a direction opposite the direction of flow of the current signal through said control windings.

7. A magnetic amplifier comprising two pairs of reactor elements each having a load winding and control winding thereon, a first circuit means connecting one of the load windings on each of said pairs of reactor elements in separate parallel branch circuits and in series with a D. C. load and first and second resistance elements across one half of a center-tapped secondary winding of a transformer, a second circuit means connecting the other of said load windings on each of said pairs of reactor elements in separate parallel branch circuits and in series with said D. C. load and said first and second resistance elements across the other half of the center-tapped secondary winding of the transformer, rectifiers in each of said branch circuits arranged so as to cause current to flow through one of the branch circuits in each said first and second circuit means and differentially through said load and said first and second resistance elements during one half-cycle of a supply voltage applied to said transformer and through the other of the branch circuits in each of said first and second circuit means and differentially through said load and first and second resistance elements during the other half cycle of the supply voltage, an input circuit including said control windings arranged so as to cause the impedances of the load windings in each said first and second circuit means to be differentially varied in response to a current signal applied to said input circuit, means responsive to the potential drop across said first resistance element for deriving a current correlative therewith and for applying the current to the control windings in a direction opposite the direction of flow of the current signal therethrough, and means including regenerative feedback windings on said reactor element and responsive to the potential drop across the second resistance element for applying regenerative feedback to said reactor elements of a magnitude such as to provide compensated feedback.

8. A magnetic amplifier comprising two pairs of reactor elements each having a load winding and a control winding thereon, a first circuit means connecting one of the load windings on each of said pairs of reactor elements in separate parallel branch circuits and in series with an A. C. load and first and second resistance elements across one-half of a center-tapped secondary winding of a transformer, a second circuit means connecting the other of said load windings on each of said pairs of reactor elements in separate parallel branch circuits and in series with said A. C. load and third and fourth resistance elements across the other half of the center-tapped secondary winding of the transformer, rectifiers in each of said branch circuits arranged so as to cause current to flow through one of the branch circuits in each of said first and second circuit means and differentially through said first and second resistance elements and said A. C. load during one-half cycle of a supply voltage applied to said transformer and through the other of said branch circuits in each said first and second circuit means and differentially through said third and fourth resistance elements and said A. C. load during the other half-cycle of said supply voltage, an input circuit including the control windings on said reactor elements arranged so as to differentially vary the impedances of the load windings in each said first and second circuit means in response to a current signal applied to said input circuit, means including regenerative feedback windings on said reactor elements and responsive to the potential drop across all of said resistance elements for applying regenerative feedback of a magnitude such as to provide compensated feedback, and means responsive to the potential drop across said second and third resistance elements for applying a current correlative therewith to the control windings in a direction opposite the direction of flow of the current signal therethrough.

References Cited in the file of this patent

UNITED STATES PATENTS

| | | |
|---|---|---|
| 2,464,639 | Fitzgerald | Mar. 15, 1949 |
| 2,512,317 | Edwards et al. | June 20, 1950 |
| 2,571,708 | Graves | Oct. 16, 1951 |

FOREIGN PATENTS

| | | |
|---|---|---|
| 233,962 | Switzerland | Dec. 1, 1944 |

OTHER REFERENCES

Publication, "The Transductor Amplifier," by Ulrik Krabbe, 1947.